United States Patent [19]

Fitzgerald

[11] Patent Number: 4,799,213

[45] Date of Patent: Jan. 17, 1989

[54] DATA TRANSMISSION SYSTEM

[75] Inventor: John Fitzgerald, Gwent, Wales

[73] Assignee: Standard Telephones & Cables, London, England

[21] Appl. No.: 648,127

[22] Filed: Sep. 7, 1984

[30] Foreign Application Priority Data

Sep. 10, 1983 [GB] United Kingdom ............... 8324310

[51] Int. Cl.[4] .............................................. H04J 1/02
[52] U.S. Cl. ........................................ 370/30; 370/76
[58] Field of Search ..................... 375/118, 80, 65, 88,
375/91; 370/69, 1, 30, 57, 24, 76; 455/229;
329/126; 179/18 C, 18 EA, 2 DP

[56] References Cited

U.S. PATENT DOCUMENTS

| | | | |
|---|---|---|---|
| 2,985,717 | 5/1961 | Gardner et al. | 375/88 |
| 3,506,784 | 4/1970 | Garland | 375/65 |
| 3,701,851 | 10/1972 | Starrett | 370/57 |
| 3,746,993 | 7/1973 | Ahmed et al. | 329/123 |
| 3,819,853 | 6/1974 | Stein | 375/118 |
| 3,937,889 | 2/1974 | Bell, III et al. | 179/2 DP |
| 4,160,121 | 7/1974 | Kaufman | 375/65 |
| 4,236,244 | 11/1980 | Strehl | 370/30 |
| 4,271,513 | 6/1981 | Maejima et al. | 370/15 |
| 4,330,687 | 5/1982 | Foulkes et al. | 370/30 |
| 4,330,886 | 5/1982 | Fukuda et al. | 179/2 DP |
| 4,456,985 | 6/1984 | Carsten et al. | 370/30 |
| 4,481,622 | 11/1964 | Cheng et al. | 370/30 |

OTHER PUBLICATIONS

Powell-FSK Demodulator Circuit-IBM Tech. Discl. Bulletin-vol. 21, #1, Jun. 1978, pp. 339, 340.
Esteban-Hybrid Transmission-IBM Tech. Discl. Bulletin-vol. 19, #7-Dec. 1976-pp. 2571, 2572.

Primary Examiner—Douglas W. Olms
Attorney, Agent, or Firm—Dennis P. Clarke

[57] ABSTRACT

Voice and data signals can be transmitted simultaneously yet independently over a subscriber telephone line. The speech and data use the same cable pair as far as the local exchange but thereafter they may be routed to the same destination or to different destinations, as desired. Each terminal unit (A or B) has a low pass filter (2) to isolate the voice and data. A data switch (5) switches an oscillator (6) by FSK. Switch (7) locks onto the Data Ready Interface (8). Bandpass filter (9) feeds the signal to the telephone line. A loop back switch LBS provides for testing from the exchange.

3 Claims, 6 Drawing Sheets

DATA TRANSMISSION SYSTEM

This invention relates to data transmission systems, in particular to data transmission over subscriber telephone cables.

It is already known to transmit data signals over twisted wire pairs and systems are already known which enable data and voice transmission to carry on simultaneously over the same physical pair of conductors.

However these present systems tend to be expensive and cannot operate at line losses much above 25 dB. It is an object of the present invention to provide a system for transmitting voice and data independently but simultaneously over a pair of wires in an economical way, and with line losses up to 40 dB.

According to one aspect of the present invention there is provided a transmission system in which data and voice signals can be transmitted independently yet simultaneously over a telephone line, the system comprising first and second terminals, the terminals being connectible between a data terminal unit or a telephone exchange and the telephone line, each terminal comprising: first and second bandpass filters for selecting transmit and receive carrier signals in respective transmit and receive circuits of the terminal; a modulator for modulating the transmit carrier with data to be transmitted from the transmit circuit to the line; a demodulator in the receiver circuit for recovering received data from the carrier received from the line; an amplifier in the receive circuit for amplifying the received data; characterised in that the filters have different passbands lying in the range 36 kHz to 68 kHz; and a low pass LC passive filter is provided for isolating the voice and data signals and effective to minimise the effects of low frequency interference signals affecting the data transmission.

According to another aspect of the invention there is provided a duplex data transmission system in which data and voice signals can be transmitted independently yet simultaneously via two terminals arranged to cooperate with each other over a telephone line, such terminal comprising: a low pass filter to separate the voice and data signals; a first carrier bandpass filter; a second carrier bandpass filter; the two filters selecting data-bearing carrier signals; a modulator for modulating the transmit carrier with the data signals to be transmitted via one of the bandpass filters; a demodulator for recovering received data from the carrier received via the other bandpass filter; and a carrier detection circuit characterised in that the first filter has a pass frequency in the range 60–68 kHZ and the second filter has a pass frequency in the range 36–44 kHz, is provided for detecting the presence of received carrier and effective to inhibit or enable operation of data terminal equipment coupled to the system in dependence upon the level of the received carrier.

Preferably the means for modulating the carrier for transmission uses frequency shift keying techniques and comprises an oscillator, an active bandpass filter, and an electronic switch which controls the filter characteristics to produce the two FSK frequencies.

According to yet another aspect of the present invention one of the terminals has a loopback switch which has a first state in which normal transmission and reception takes place and a second state in which a data signal received and recovered is looped back into the modulator and re-transmitted from that terminal to facilitate a test procedure to test the system.

In a preferred embodiment the carrier detection circuit comprises an amplifier for amplifying the incoming signal, a balanced rectifier for rectifying the amplified signal, and a Schmitt trigger circuit for receiving the rectified signal and effective to clamp the output in the event of the level of the carrier signal falling below a predetermined minimum value.

According to yet another aspect of the present invention the terminal has a synchronous oscillator circuit for providing a synchronising clock signal from the terminal, the oscillator circuit comprising an input for receiving decoded data, an edge detector for producing a short pulse for each data transmission, and a binary counter arranged to count a local oscillator signal which is reset by the short data transmission pulses to provide the synchronising clock signal.

In order that the invention can be clearly understood reference will now be made to the accompanying drawings, wherein.

Figure 1:
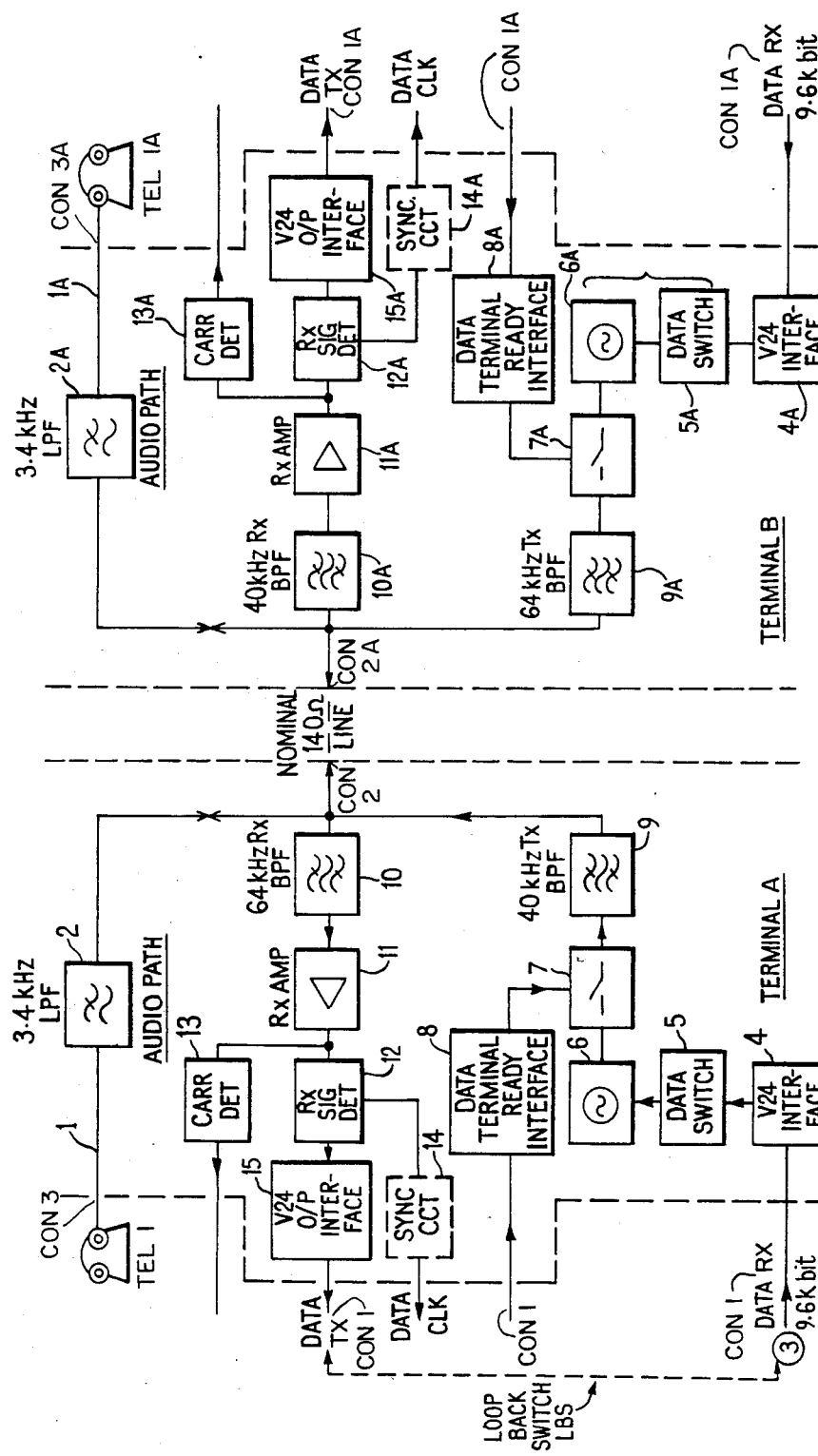
FIG. 1 is a block circuit diagram of a data and voice transmission system according to an embodiment of the present invention.

Referring to FIG. 1 there is shown a subscriber terminal A on the left hand side and an exchange terminal B on the right hand side connected at second connections CON 2, CON 2A by a nominal 140 Ohm line which would normally be a twisted wire pair. The two terminals are similar and comprise similar components except that the transmit frequency for the subscriber terminal is 40 kHz and the receive frequency is 64 kHz whereas the exchange terminal transmits at 64 kHz and receives at 40 kHz. This could be the other way round.

The system provides a data link over an existing telephone network, in such a way that the transmission of data over a cable pair does not affect the simultaneous transmission of speech using the telephones TEL1, TEL1A, connected to the terminals A, B, at respective connections CON3, CON3A. The speech and data use the same cable pair as far as the local exchange, but thereafter they may be routed to the same destination or to different destinations, as desired.

Carrier-frequency techniques are used to provide a full duplex data channel, together with a completely independent normal telephone service, over a single unloaded cable pair. Each terminal interfaces via connections CON1, CON1A with the data terminal unit, which may be a visual display unit, a word processor, facsimile equipment, or telemetry and security equipment. The telephone may continue to be used in the normal originate and receive speech calls by using audio frequencies. At the exchange, the exchange unit separates the derived data channel from the physical voice channel.

Alternatively it is possible to patch the exchange with a passive bridging filter so that only two terminals are required, one at each subscriber terminal. This would be applicable to a "dedicated" telephone line and is described later with reference to FIG. 5.

Yet another alternative is for example a PABX which can handle carrier frequencies, would be once again to have no terminal i.e. in the exchange, simply a terminal at each subscriber i.e. a call-connect system. We have found that the equipment to be described can cope with a line loss of up to 40 dB. Therefore even with a 20 dB loss in the exchange, caused mainly by the fairly massive loading coils, a very significant telephone line length can still be accommodated for example at 64 kHz the attenuation of a 0.5 mm LDN cable is about 6 dB/km giving a workable line length of over 3 km for a 20 dB loss.

We have found that the main guard against impulsive noise components in the speech band resides in the passive low pass LC filters 2 and 2A and the design of this is critical. Passband loss must be low and stop band loss high with good impedance presentation to the telephone handset with d.c. passage up to 100 mA. The loss over the frequency range 200–4000 kHz is less than 1.5 dB where the send and terminating impedance is 600 ohms. At 150 ohms termination and send impedance the loss is not greater than:

| | |
|---|---|
| 7.5 dB at | 4 kHz |
| 1.0 dB at | 6 kHz |
| 18.0 dB at | 10 kHz |
| 35.0 dB at | 16 kHz |
| 40.0 dB at | 20 kHz |
| 50.0 dB at | 30 kHz |
| 70.0 dB at | 50 kHz |
| 80.0 dB at | 70 kHz |
| 80.0 dB at | 100 kHz |

Each terminal has a transmit and receive circuit and an audio path 1 via a 3.4 kHz low pass filter 2 which isolates the audio signals from the data signals. In the transmit circuit a data terminal input 3 is connected via a V24 interface 4 to a data switch 5 which switches an oscillator circuit 6 to modulate the data by frequency shift keying onto the transmit carrier at 40 kHz. Switch 7 locks on to the Data Terminal Ready interface 8. The bandpass filter 9 feeds the signal to the telephone line.

In the receive circuit a received data signal passes through a receive bandpass filter 10 centered at 64 kHz, a receive amplifier 11 and a receive signal detector 12. A carrier detect circuit 13 detects the presence of a carrier having at least a predetermined minimum level, below which the equipment is clamped in a non-operate state. A synchronising circuit 14 provides a data clock signal for synchronising the data terminal equipment for synchronous operation although a synchronous operation is normal since this data transmission system is designed to be transparent to the transmission of data. A V24 output interface 15 couples the signal detector output to the data terminal unit.

The above description relates to the left hand side of the block diagram 1, and on the right hand side similar components have been given similar reference numerals with the suffix A.

The system operates as follows. One of the terminals connected to a data terminal unit (DTU) receives a Data Terminal Ready (DTR) signal from the DTU. This switches the data-bearing carrier frequency to line. At the same time the terminal A (for example) returns a Data Set Ready (DSR) signal to the DTU. Alternatively the same interface protocol can be achieved using a Request to Send (RTS) signal and returning a Clear to Send (CTS) signal: this procedure also switches the carrier frequency to line. Data can now be received by the terminal A from the DTU and sent to line. On receipt of the carrier frequency at the far end, terminal B, it is converted to data and fed to the Received Data interface at the far end DTU. The Carrier Detection Circuit 13A detects the incoming carrier and produces a 12 volt d.c. output. It passes the signal to the DTU thereby signifying that valid carrier signals are being received from the originating DTU.

Figure 2:
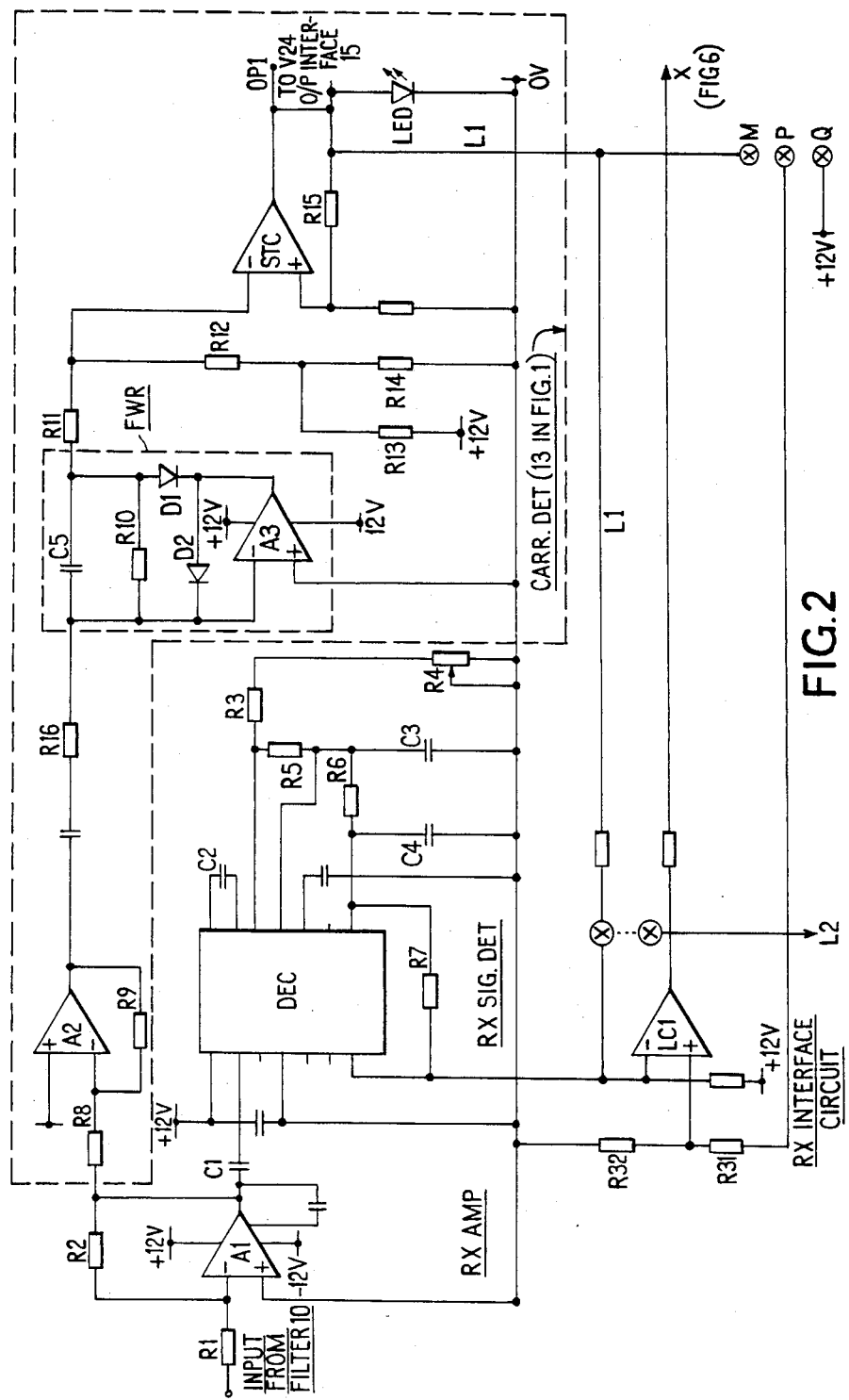
FIG. 2 is a detailed circuit diagram of the FSK decoder and carrier detection circuit of FIG. 1.

Referring now to FIG. 2 the receive FSK decoder 12, carrier detector circuit 13, receive amplifier 11, and receive interface circuit 15, of FIG. 1, are all shown in detail. The input to the decoder is buffered by a preamplifier A1 with resistors R1 and R2 performing the gain function. The output of A1 is a.c. coupled by capacitor C1 to the input pin of the FSK integrated circuit decoder DEC. This is a phase-locked loop decoder whose frequency is set by resistors R3, R4 and capacitor C2. The centre frequency is derived from the relationship:

$$f_o = (f_1 + f_2)/2$$

where $f_1$ and $f_2$ are the mark and space frequencies.

The system bandwidth is set by resistor R5.

Capacitor C3 sets the loop filter time constant and the loop damping factor. Capacitor C4 and resistor R6 form a post-detection filter. Resistor R7 provides positive feedback of the FSK decoder chip, which is infact a comparator, to facilitate rapid transactions between logic output states.

The presence of an incoming carrier of at least a predetermined minimum level is detected by the carrier detection circuit 13 of FIG. 1. The function of the carrier detect circuit is to determine whether the incoming data signal is a valid signal or not. Thus if the loss of the telephone line (or telephone line plus PABX loading coils in an embodiment where the PABX switch can transmit data and the transmission terminals A and B are both located at subscriber locations) exceeds 40 dB then the carrier detect circuit will lock out. In detail in FIG. 2 this circuit is enclosed in broken line as indicated. The incoming amplified signal (referring to FIG. 2) is further amplified by amplifier A2, the resistors R8 and R9 performing the gain function. The signal is then rectified by a full wave rectifier arrangement FWR comprising an amplifier A3, diodes D1 and D2, capacitor C5, and resistor R10.

The rectified signal is fed to a Schmitt trigger circuit STC whose bias is set by resistors R11, R12, R13 and R14. The hysteresis of the circuit is set by resistor R15 for approximately 3 dB, and the switching point is set by resistor R16 for a minimum level of −40 dB ref., the voltage corresponding to 0 dBm/140 Ohms.

The output of the Schmitt trigger STC on the one hand drives a light emitting diode LED which indicates, when illuminated, the validity of the incoming carrier signal and is extinguished when invalid; on the other hand the output is fed to the V24 interface connection terminal OP1, and via line L1 to the negative input of logic circuit LC1.

The decoded data output signal from the FSK decoder DEC is also fed to the negative terminal of the logic circuit LC1 whose positive terminal is set by voltage divider resistors R31, R32 to either a positive or negative 6 volt DC potential (M.P.Q.) depending on the desired logic state of the output of circuit LC1 when no incoming signal is detected. The output of circuit LC1 is fed to a V24 interface connection, i.e. part of block 15 in FIG. 1.

Figure 3:
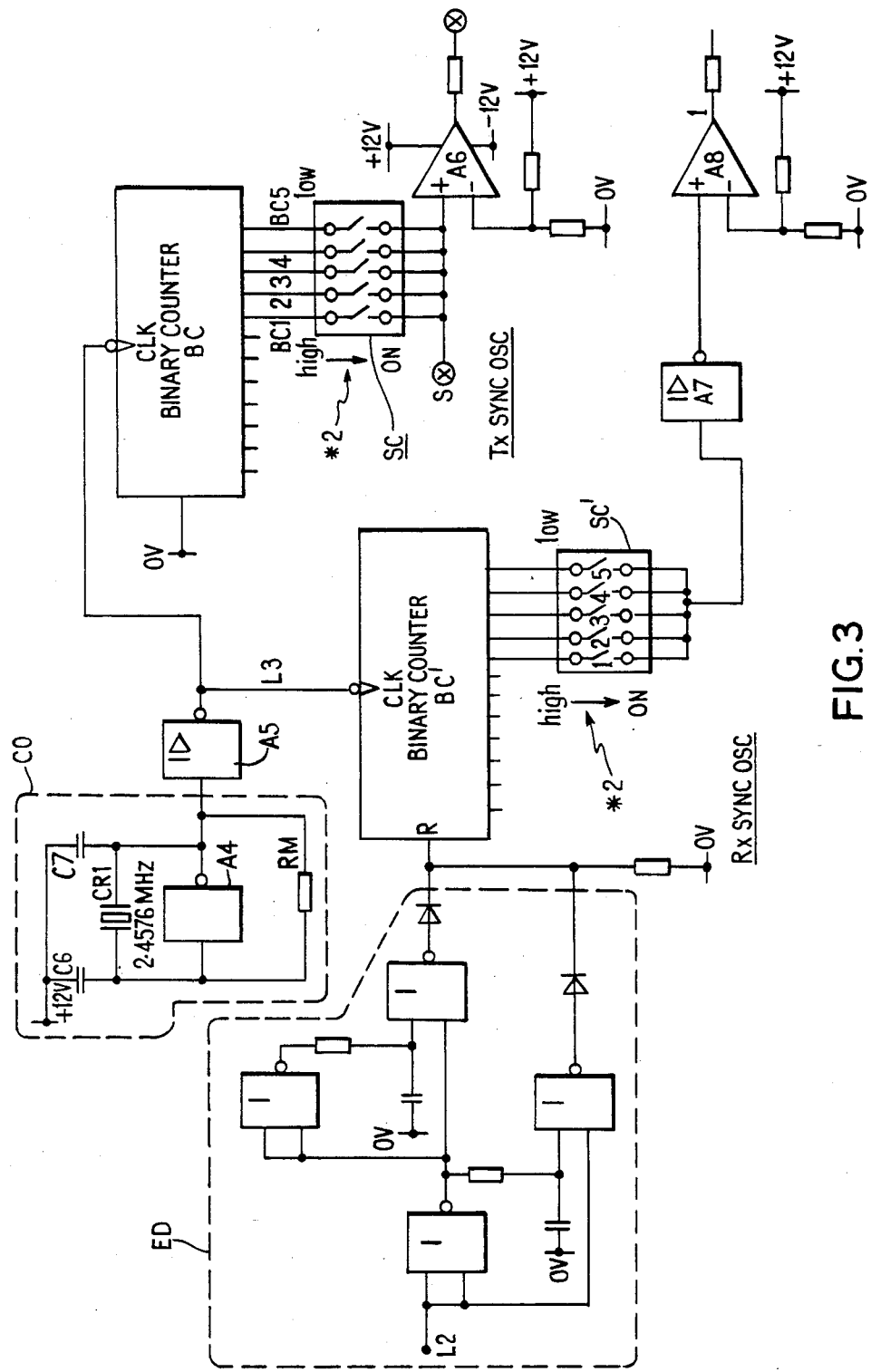
FIG. 3 is a detailed circuit diagram of the synchronising oscillator output circuit of FIG. 1.

Referring now to FIG. 3 for synchronous versions of the data transmission system receive and transmit synchronous oscillators (synchronising circuit 14, FIG. 1) are provided. These form a basic part of the equipment and are either connected in circuit for synchronous versions or are left unconnected for asynchronous versions of the equipment.

The transmit clock source comprises a crystal oscillator CO (in broken line) which consists of an inverting operational amplifier A4, a crystal CR1 having a frequency of 2.4576 MHz, start-up capacitors C6 and C7, and resistor R17. The oscillator output is fed by an integrated circuit buffer inverter A5 to the clock input of an integrated circuit binary counter BC whose reset is held low.

The counter outputs BC1 to BC5 are at twice the data frequency and they are fed to an integrated switching circuit SC. Only one switch is in the operate state at any one time. The lowest switch number corresponds to the highest baud rate as shown below:

| Switch position: | BC1 | BC2 | BC3 | BC4 | BC5 |
|---|---|---|---|---|---|
| Baud rate: | 9600 | 4800 | 2400 | 1200 | 600 |

The receive clock circuit is synchronised as follows. The data output from the decoder DEC is fed via line L2 to a CMOS edge detector circuit ED (enclosed in broken line) which produces a short pulse for each data transition. The pulses vary in sympathy with the received data and are used to reset an integrated circuit binary counter BC'. The clock signal to this device is derived from the crystal oscillator CO via line L3. The outputs of the binary counter BC' are derived by dividing the crystal oscillator frequency by $2^n$ where $n=10$, 11, 12, 13, 14 and 15.

These outputs are fed to a second integrated switch circuit SC' whose switch positions 1 to 5 correspond to the baud rates as shown below:

| Switch position: | 1 | 2 | 3 | 4 | 5 |
|---|---|---|---|---|---|
| Baud rate: | 9600 | 4800 | 2400 | 1200 | 600 |

The wave form is then inverted by an integrated buffer inverter A7 to give a negative edge at the centre of each data bit (i.e. the clock runs at twice the data frequency). The resulting waveform is fed via a level shift circuit A8 to the V24 interface connection.

Figures 4, 4A:
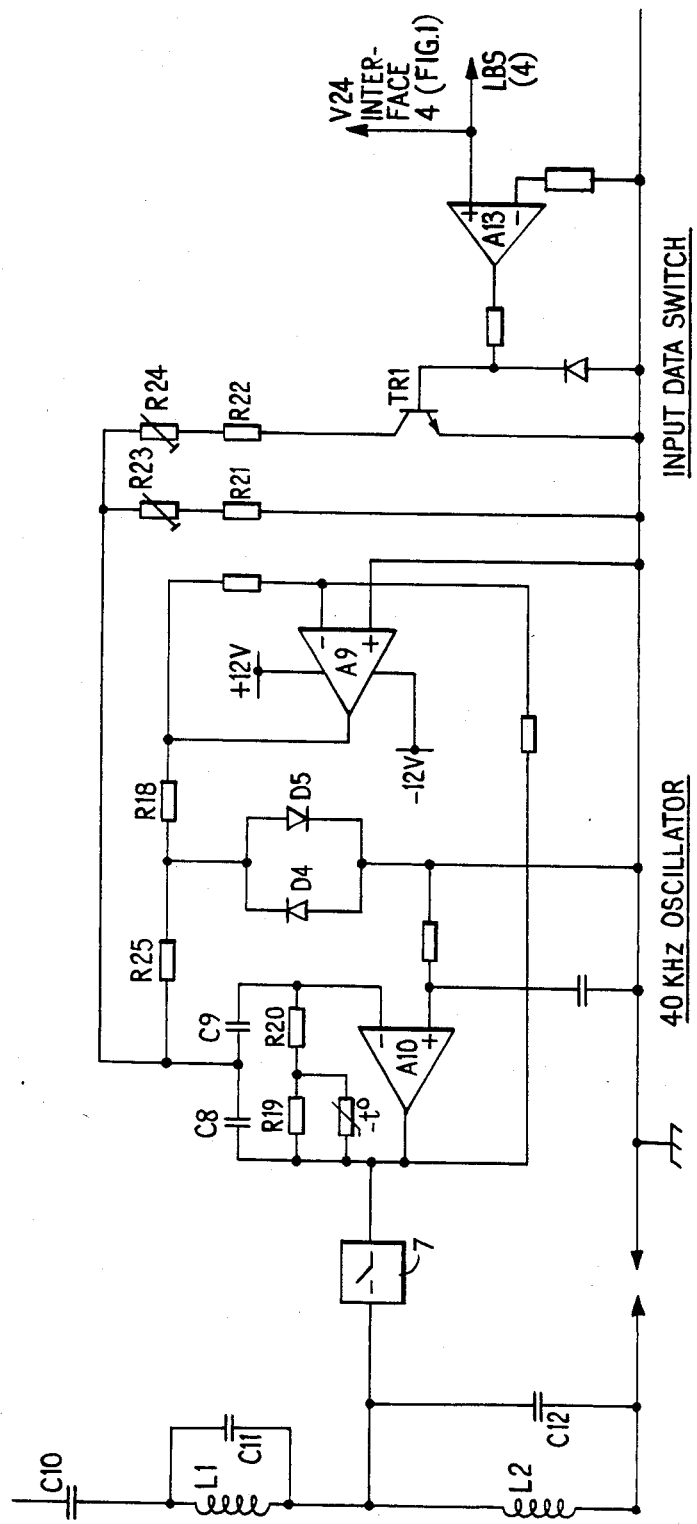
FIG. 4 and 4A are detailed circuit diagrams of the transmit oscillator and data switch of FIG. 1.

Referring to FIG. 4 the transmit oscillator 6 and data switch 5 will now be described. The oscillator is a frequency keying oscillator which produces a clipped sine wave which is filtered to produce a pure sine wave fundamental waveform. An amplifier A9 forms part of a unity gain inverting amplifier. Its output is set by diodes D4 and D5 and resistor R18 controls the current through the diodes. Amplifier A10, resistors R19, R20, R21 and R22, potentiometers R23, R24 and capacitors C8 and C9 form an active 40 kHz (or 64 kHz) bandpass filter.

In the input data switch the transistor TR1 acts as a switch to shunt potentiometer R24 and resistor R22 across potentiometer R23 and resistor R21, thus changing the filter characteristics to produce the two FSK frequencies, which are 43.86 kHz (level 0) and 36.14 kHz (level 1) or 67.88 kHz (level 0) and 60.14 kHz (level 1). For oscillation to occur the phase shift around the oscillator must be 0° or multiples of 360°. Therefore the frequency which is phase shifted by 180° through the filter is the oscillating frequency. The gain of the oscillator is controlled by resistor R25 and the output frequency appears at terminal Z.

If $f_c$ is the carrier frequency, and $f_o$ is the FSK frequency, then $f_c-f_o$ corresponds to a data "1" and $f_c+f_o$ corresponds to a data "0".

The transmit bandpass filter 9 of FIG. 1 shown in detail in FIG. 4a consists of a capacitor C10, inductors L1 and L2, capacitors C11 and C12. It is a passive two-section filter which operates between source and load impedance of 1 kilohm.

Figure 5:
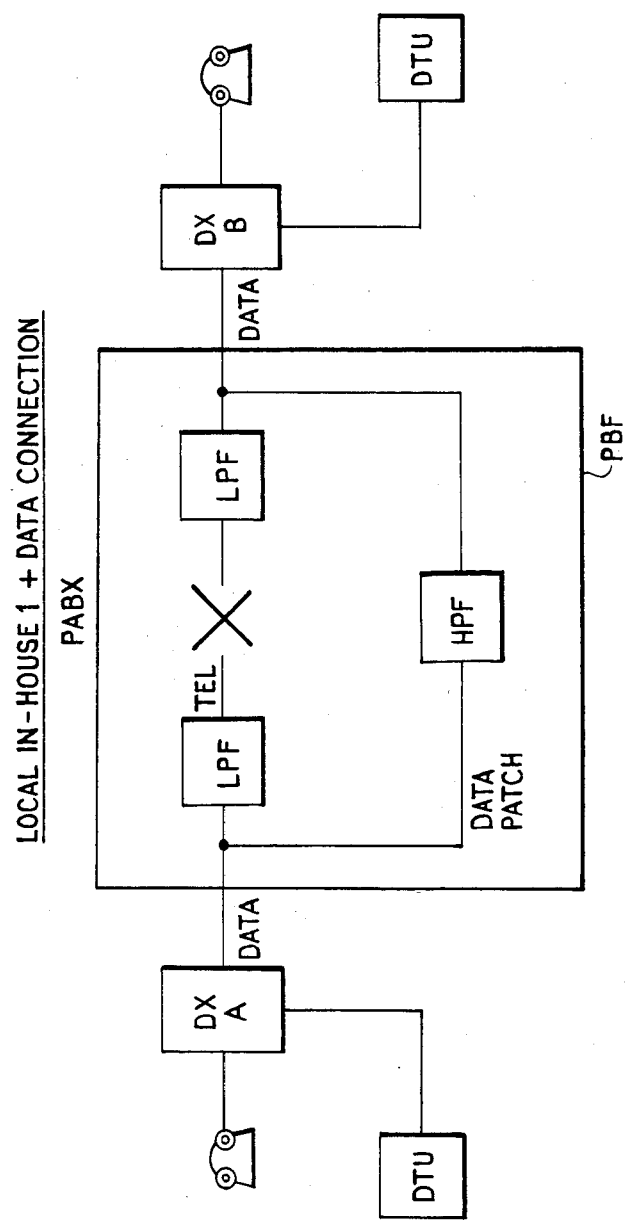
FIG. 5 is a block diagram of a data and voice transmission system according to another embodiment of the invention in which one of the subscribers is a dedicated data terminal.

In one embodiment of the invention the two transmission terminals shown in FIG. 1 can be located each at a subscriber station where the data equipment is arranged locally "in-house". FIG. 5 shows this. In addition to the terminals A and B there is provided a passive bridging filter PBF where carrier transmission through the local exchange switch is not possible (e.g. a digital exchange). This bridging filter PBF includes data patch connected via a high pass filter HPF with low pass filters LPF allowing the voice or speech path to feed into the exchange for switching as required.

Figure 6:
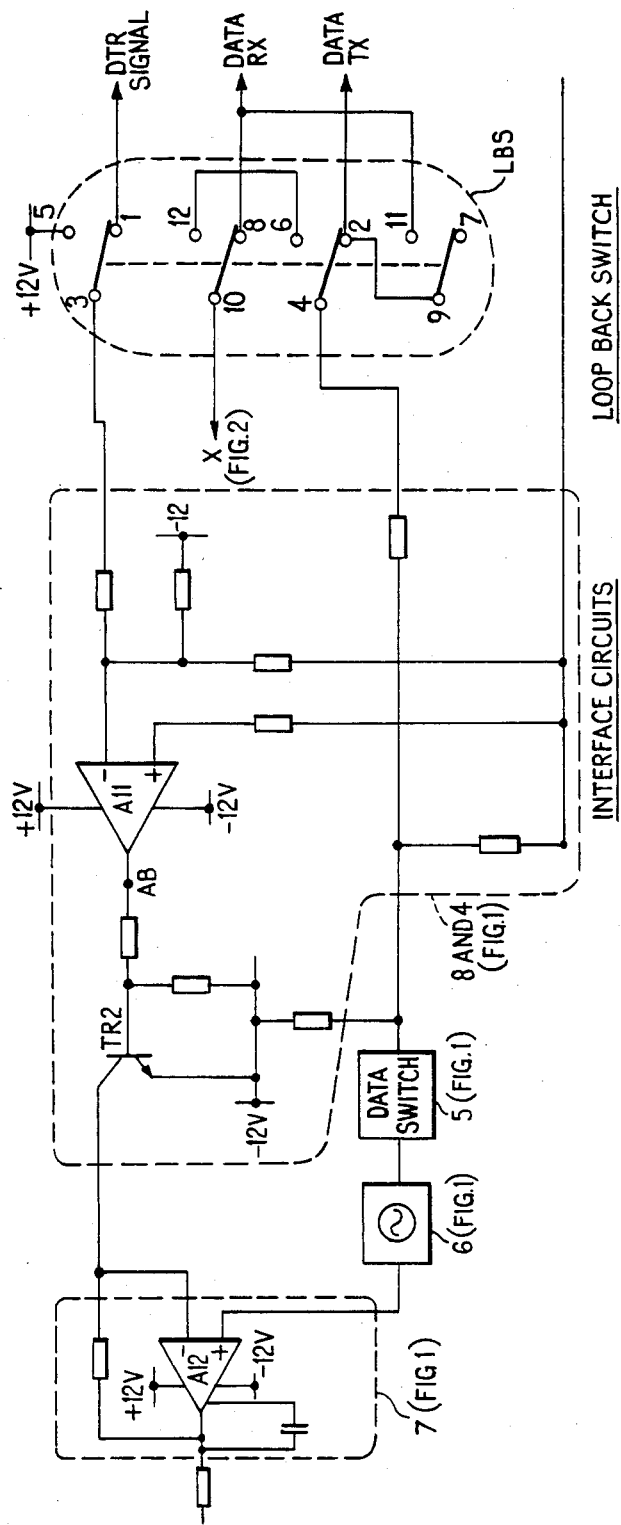
FIG. 6 shows circuit details of a loopback switch for test procedures, together with interface circuits for the subscriber terminal A shown in FIG. 1.

Referring to FIG. 6 there is shown a loopback switch LBS controlled by a manual control button on the subscriber terminal A of FIG. 1. This switch on the subscriber terminal A or B provides a loopback test facility when in the operate position (i.e. depressed). As shown in the drawing it is in its normal (unoperated) state. When operated it connects together the transmit and receive paths via terminals 10, 12, 6 and 4 so that data received via connections CON2 (CON2A) is returned to the line; and it holds the Data Terminal Ready DTR interface 9 (FIG. 1) to +12 volts via terminals 3 and 5, thus allowing the data-bearing carrier frequency to be switched by switch 7 (FIG. 1) continuously to line via the bandpass transmit filter 9 (FIG. 1). Thus the received data is looped back to the source. Further data from the associated data terminal unit DTU via the connections CON1 (CON1A) is returned through the LBS switch contacts 2, 9, 11; i.e. DATA TX and DATA RX are connected together, so that the switch LBS provides two separate loops.

A V24/V28 interface between the Data Terminal unit and the terminal A is provided by amplifier A11 which operates as a comparator. When data is to be transmitted from the DTU the terminal A receives either a Data Terminal Ready (DTR) signal or a Request to Send (RTS) signal which is generated by the DTU. The terminal responds by returning a Data Set Ready (DSR) or Clear to Send (CTS) signal, respectively, to the DTU. This is a level 1 interface which signifies that data can now be transmitted by the DTU.

On receipt of a DTR or RTS signal the input of amplifier A11 will go to a high state, which will cause the logic level at terminal AB to be low. This in turn switches transistor TR2 off, which enables amplifier A12, thus allowing the carrier frequency to be transmitted to line via the bandpass transmit filter.

Similarly, data is presented to the terminal A in the V24/V28 format, i.e. ±12 volts to ±3 volts working into a load between 3 and 7 kilohms. The ouput of amplifier A13 of FIG. 4 is the inverse of the input data; this switches transistor TR1 on/off in sympathy with the incoming data, as previously explained, in the data switch 5.

I claim:

1. A transmission system in which data and voice signals can be transmission system in which data and voice signals can be transmitted independently yet simultaneously over a telephone line, the system comprising co-operating first and second terminals, each terminal having connections connectable to a respective data terminal unit, the telephone line, so that a data unit is connected to the telephone line via the associated terminal and to a respective telephone, the first terminal having means for generating a first carrier signal above voice frequency, the second terminal having means for generating a second carrier signal above voice frequency, the first and second carrier signal frequencies being substantially separated from each other and being permanently assigned to respective terminals, each of said terminals further comprising: first and second bandpass filters used for selecting respectively said first and second carrier signals in respective transmit and receive circuits of the terminal, the receive passband of the first terminal and the transmit passband of the second terminal being centered on said second carrier frequency and the transmit passband of the first terminal and the receive passband of the second terminal being centered on said first carrier frequency; said transmit circuit including a modulator for modulating the respective carrier signal with data for transmission from the transmit circuit to the line via said connections; said receive circuit including a demodulator coupled to said second filter and used for recovering data from the respective carrier signal received from the line via said connections, and an amplifier used for amplifying the recovered data; a low pass filter coupled to said connections to receive both voice and carrier signals from the telephone line and having a passband effective to pass only voice signals and thus isolate the voice and data signals and having a loss frequency characteristic effective to minimize the effects of low frequency interference signals affecting the data transmission, and wherein one of said terminals has a manually operable loopback switch connected to the connections connectible to the data terminal unit and having a first state in which normal transmission and reception takes place between the associated data terminal unit and the telephone line via said one terminal, and a second state in which data from the telephone line is looped back to the telephone line via said connections connectible to the telephone line and data from the associated data terminal unit is looped back to the data terminal unit via the connections connectible to the data terminal unit to facilitate a test procedure to test the system.

2. A transmission system as claimed in claim 1, wherein the modulator for modulating each transmit carrier signal uses a frequency shift keying technique and comprises an oscillator, an active bandpass filter receiving signals from the oscillator, and an electronic switch which controls the filter characteristics to produce the two FSK frequencies.

3. A transmission system as claimed in claim 1 wherein one of said terminals has a carrier detection circuit comprising an amplifier for amplifying the carrier signal received from the line via said second connections, a balanced rectifier for rectifying the amplified signal and a trigger circuit coupled to receive the rectified signal and having a switching point set to clamp the output of said carrier detection circuit at said second connections in the event of the level of the carrier signal falling below a predetermined minimum value corresponding to the switching point.

* * * * *